US011773499B2

(12) United States Patent
Davis (10) Patent No.: US 11,773,499 B2
(45) Date of Patent: *Oct. 3, 2023

(54) SYSTEM AND METHOD FOR PURIFYING DEPLETED BRINE

(71) Applicant: Westlake Vinyl Corporation, Houston, TX (US)

(72) Inventor: Anthony B. Davis, Gonzales, LA (US)

(73) Assignee: Westlake Vinyl Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,331

(22) Filed: Sep. 21, 2021

(65) Prior Publication Data

US 2022/0002888 A1  Jan. 6, 2022

Related U.S. Application Data

(63) Continuation of application No. 16/298,811, filed on Mar. 11, 2019, now Pat. No. 11,124,887, which is a (Continued)

(51) Int. Cl.
*C25B 15/08* (2006.01)
*B01D 1/18* (2006.01)
(Continued)

(52) U.S. Cl.
CPC .............. *C25B 15/08* (2013.01); *B01D 1/18* (2013.01); *B01D 1/26* (2013.01); *B01D 21/262* (2013.01);
(Continued)

(58) Field of Classification Search
CPC ......... C25B 15/08; C25B 15/087; C25B 1/34; B01D 1/18; B01D 1/26; B01D 21/262; B01D 21/267
See application file for complete search history.

(56) References Cited

U.S. PATENT DOCUMENTS 2,326,024 A  8/1943  George
2,863,809 A  12/1958  Hans
(Continued)

FOREIGN PATENT DOCUMENTS

EP      0609839      10/1997
GB       721981       1/1955
WO    2012116058      8/2012

*Primary Examiner* — Gabriel E Gitman
(74) *Attorney, Agent, or Firm* — Schultz & Associates, P.C.

(57) ABSTRACT

A system and method for removing impurities to reconstitute a NaCl stream to a saturated solution salt solution and remove any impurities such as sodium bisulfite (NaHSO$_3$), sodium chlorate (NaClO$_3$) and sodium iodide (NaI) to improve brine quality from an electrolytic cell is disclosed, including an evaporation system connected to the electrolytic cell, a brine treatment system connected to the evaporation system and the electrolytic cell. A waste treatment system is connected to the evaporation system. The evaporation system includes a set of evaporators that concentrates the brine. Sodium chloride is precipitated from the set of evaporators to the brine treatment system. Impurities are precipitated from the set of evaporators. The brine treatment system includes a hydrocyclone and a centrifuge that separates sodium chloride from water. The sodium chloride is mixed with water to create a concentrated and purified brine.

18 Claims, 5 Drawing Sheets

Related U.S. Application Data continuation of application No. 14/959,493, filed on Dec. 4, 2015, now Pat. No. 10,227,702.

(60) Provisional application No. 62/088,152, filed on Dec. 5, 2014.

(51) Int. Cl.
*B01D 1/16* (2006.01)
*B01D 21/26* (2006.01)
*B01D 1/26* (2006.01)
*C25B 1/34* (2006.01)

(52) U.S. Cl.
CPC .............. *B01D 21/267* (2013.01); *C25B 1/34* (2013.01); *C25B 15/087* (2021.01)

(56) References Cited

U.S. PATENT DOCUMENTS

| | | | |
|---|---|---|---|
| 2,941,590 A | 6/1960 | Rosenblad | |
| 3,258,060 A | 6/1966 | Chirico | |
| 3,332,470 A | 7/1967 | Chirico et al. | |
| 3,362,457 A * | 1/1968 | Chirico | B01D 9/0018 23/296 |
| 3,477,829 A | 11/1969 | Dockendorff et al. | |
| 3,586,090 A | 6/1971 | Henderson | |
| 3,857,704 A | 12/1974 | Coulter | |
| 3,870,585 A | 3/1975 | Kearns | |
| 3,897,320 A | 7/1975 | Cook | |
| 3,990,957 A | 11/1976 | Hoekje et al. | |
| 4,087,253 A | 5/1978 | Zabotto et al. | |
| 4,145,265 A | 3/1979 | Nakata et al. | |
| 4,169,773 A | 10/1979 | Lai et al. | |
| 4,231,840 A * | 11/1980 | Geesen | B01D 1/26 23/302 R |
| 4,267,026 A * | 5/1981 | Patel | C25B 15/08 205/536 |
| 4,397,720 A | 8/1983 | Moore et al. | |
| 4,459,188 A * | 7/1984 | Rutherford | C25B 15/08 205/536 |
| 4,481,088 A | 11/1984 | Moore et al. | |
| 4,839,003 A | 6/1989 | Dworak et al. | |
| 5,126,019 A | 6/1992 | Rutherford et al. | |
| 5,330,618 A | 7/1994 | Daniels et al. | |
| 6,132,591 A | 10/2000 | Matsuoka et al. | |
| 6,306,291 B1 * | 10/2001 | Lueck | B01D 65/10 73/61.73 |
| 6,309,530 B1 | 10/2001 | Rutherford et al. | |
| 10,227,702 B2 * | 3/2019 | Davis | C25B 15/08 |
| 11,124,887 B2 * | 9/2021 | Davis | B01D 1/18 |
| 2004/0047781 A1 | 3/2004 | Becenel | |
| 2008/0053839 A1 | 3/2008 | Wolfgang et al. | |
| 2009/0026084 A1 | 1/2009 | Davis et al. | |
| 2010/0032311 A1 | 2/2010 | Davis et al. | |
| 2010/0219372 A1 * | 9/2010 | Hook | C01D 3/14 205/687 |
| 2011/0297600 A1 | 12/2011 | Constantz et al. | |

* cited by examiner

SYSTEM AND METHOD FOR PURIFYING DEPLETED BRINE

CROSS REFERENCE TO RELATED APPLICATIONS

This application is a continuation of U.S. patent application Ser. No. 16/298,811 filed Mar. 11, 2019, now U.S. Pat. No. 11,124,887 granted on Sep. 21, 2021, which is a continuation of U.S. patent application Ser. No. 14/959,493 which filed Dec. 4, 2015, now U.S. Pat. No. 10,227,702 granted on Mar. 12, 2019, which claims the benefit of U.S. Provisional Patent Application No. 62/088,152 filed on Dec. 5, 2014. Each patent application identified above is incorporated herein by reference in its entirety to provide continuity of disclosure.

FIELD OF THE INVENTION

The present invention relates to the treatment of waste streams. In particular, the present invention relates to treating depleted brine from a chlor-alkali processing system.

BACKGROUND OF THE INVENTION

Chlor-alkali systems and processes produce chlorine, sodium hydroxide (caustic soda) and other caustic alkali products. Typically, the process is conducted in an electrolytic membrane cell using a brine, which is an aqueous solution of sodium chloride. The brine is fed into the electrolytic cell, which includes an anode side and a cathode side separated by a membrane. A current is passed through the electrolytic cell. As a result, the sodium chloride brine splits into its constituent parts. The membrane allows sodium ions to pass through it to the cathode side, where it forms sodium hydroxide in a solution. The membrane allows only positive sodium ions to pass through to prevent the chlorine from mixing with the sodium hydroxide. The chloride ions are oxidized to chlorine gas at the anode. Hydrogen gas and hydroxide ions are formed at the cathode. After this process, the brine is depleted and cannot be used in the electrolytic cell. Therefore, the depleted brine must be treated or replaced with fresh brine in order for the membrane electrolytic cell to properly operate. Further, the depleted brine must be purified to remove impurities that may cause fouling of the membrane.

The prior art has attempted to address the need for purified brine with limited success. For example, U.S. Pat. No. 4,169,773 to Lai, et al. discloses a system and method for the electrolytic production of alkali metal hydroxide and halide with acidification of part of a recirculating anolyte stream to remove halite. The system in Lai diverts a brine stream from a membrane cell to a reaction vessel for treatment. In the reaction vessel, concentrated hydrochloric acid (HCl) is added to the brine stream to minimize chlorine dioxide production. The treated stream is then irradiated with ultra violet light. The irradiated stream is passed through a scrubber before being reintroduced to the membrane cell. However, the system in Lai requires the use of hydrochloric acid and an irradiation step that increases costs and inefficiencies.

U.S. Pat. No. 6,309,530 to Rutherford, et al. discloses a system and method for the concentration of depleted brine exiting a chlor-alkali membrane cell plant. The depleted brine flows from a membrane cell into a dechlorinator where chemicals, such as sodium carbonate and sodium hydroxide are added. The dechlorinated brine is fed into a concentrator system where water vapor is removed. The reconcentrated brine is then ready for use. However, like Lai, the system in Rutherford requires the addition of chemicals, thereby leading increased costs.

Therefore, there is a need in art for a system and method for purifying brine that does not add chemicals to the brine and does not require costly compression and/or condensation steps. Thus, there is a need for a system and method of purifying depleted brine with minimal costs and steps to treat the depleted brine.

SUMMARY OF THE INVENTION

In a preferred embodiment, a system and method for concentrating and purifying depleted brine from an electrolytic cell is disclosed. The system includes a reconstitution/evaporation system connected to the electrolytic cell, a brine treatment system connected to the reconstitution/evaporation system and the electrolytic cell. A waste treatment system is connected to the reconstitution/evaporation system.

The reconstitution/evaporation system further includes a set of effect evaporators that evaporates water vapor from the depleted brine to concentrate the brine. Sodium chloride is precipitated from the set of effect evaporators to the brine treatment system. Impurities such as sodium bisulfite ($NaHSO_3$), sodium chlorate ($NaClO_3$) and sodium iodide (NaI) are precipitated from the set of effect evaporators, to improve brine quality.

The brine treatment system includes a hydrocyclone and a centrifuge that separates sodium chloride from water. The sodium chloride is mixed with water to create a concentrated and purified brine. The brine is stored for later use.

The waste treatment system includes a waste treatment tank that receives waste water from the set of effect evaporators. The waste water includes the removed impurities such as sodium bisulfite ($NaHSO_3$), sodium chlorate ($NaClO_3$) and sodium iodide (NaI). Each of the pH level and the chlorine level of the waste water is adjusted to predetermined levels. The waste water is passed through a carbon filter to complete the treatment process.

BRIEF DESCRIPTION OF THE DRAWINGS

In the detailed description presented below, reference is made to the accompanying drawings.

DETAILED DESCRIPTION OF THE INVENTION

Figure 1:
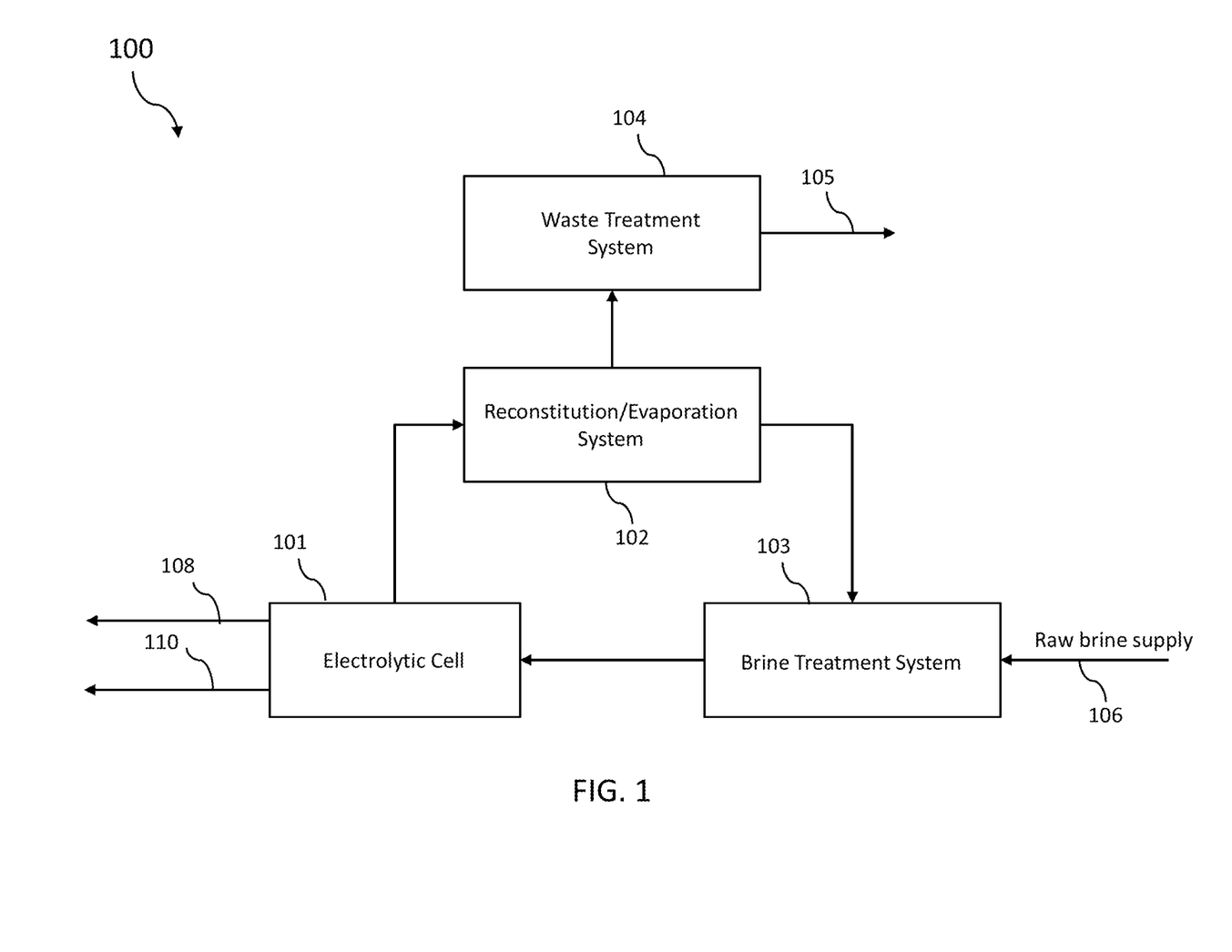
FIG. 1 is a general schematic drawing of a system for treating depleted brine of a preferred embodiment.

Referring to FIG. 1, a general schematic of system 100 for treating depleted brine will be described. System 100 is connected electrolytic cell 101. System 100 includes reconstitution/evaporation system 102 connected to electrolytic cell 101, brine treatment system 103 connected to reconstitution/evaporation system 102 and to electrolytic cell 101. Raw brine supply 106 is connected to brine treatment system 103. Waste treatment system 104 is connected to reconstitution/evaporation system 102 for the output of waste 105. Catholyte 108 and hydrogen and chloride gases 110 are remaining outputs from electrolytic cell 101.

Figure 2:
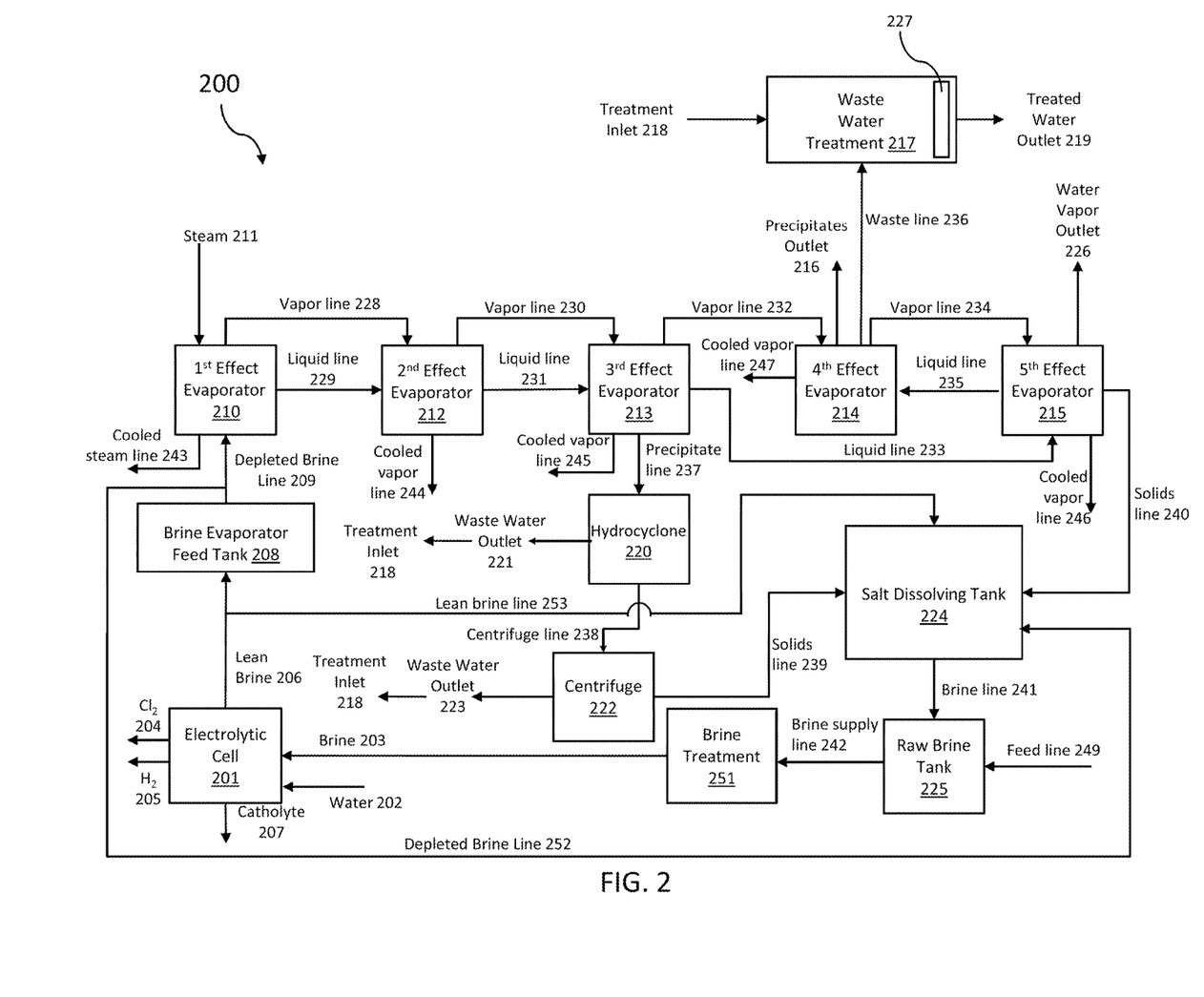
FIG. 2 is a schematic drawing of a system for treating depleted brine of a preferred embodiment.

Referring to FIG. 2, system 200 is connected to electrolytic cell 201 and forms a crystallizer which purifies depleted brine for reuse. Electrolytic cell 201 includes an anode side and a cathode side separated by a membrane. Each of water stream 202 and brine stream 203 is connected to the anode side and flows into electrolytic cell 201. An electric current is supplied to electrolytic cell 201. Each of catholyte stream 207 and hydrogen stream 205 is connected to and flows from the cathode side of electrolytic cell 201. Each of lean brine stream 206 and chlorine stream 204 is connected to and flows from the anode side of electrolytic cell 201. Lean brine stream 206 flows into brine evaporator feed tank 208 at a rate from approximately 2,800 gallons per minute (gpm) to 3,200 gpm. Lean brine stream 206 is also connected to lean brine line 253

System 200 includes brine evaporator feed tank 208, which is connected to a set of effect evaporators. Brine evaporator feed tank 208 is connected first effect evaporator 210 with depleted brine line 209. Depleted brine line 252 is connected to depleted brine line 209 and to salt dissolving tank 224. Depleted brine line 209 and depleted brine line 252 have a flow rate of approximately 2,800 gpm to 3,200 gpm and an iodine level of approximately 0.13 ppm to 0.17 ppm. Lean brine line 253 is also connected to salt dissolving tank 224. First effect evaporator 210 is connected to steam supply 211 and to cooled steam line 243. Second effect evaporator 212 is connected to first effect evaporator 210 with vapor line 228 and liquid line 229. Second effect evaporator 212 is further connected to cooled vapor line 244. Second effect evaporator 212 is connected to third effect evaporator 213 with vapor line 230 and liquid line 231. Third effect evaporator 213 is connected to fourth effect evaporator 214 with vapor line 232 and to fifth effect evaporator 215 with liquid line 233. Third effect evaporator 213 is further connected to cooled vapor line 245. Fourth effect evaporator 214 is further connected to fifth effect evaporator 215 with vapor line 234 and liquid line 235. Fourth effect evaporator is further connected to precipitates outlet 216, cooled vapor line 247, and to waste water treatment tank 217 with waste line 236. Waste water treatment tank 217 is connected to treatment inlet 218 and to water outlet 219. Waste water treatment tank 217 includes carbon filter 227 adjacent to water outlet 219.

Third effect evaporator 213 is further connected to hydrocyclone 220 with precipitate line 237. Hydrocyclone 220 is connected to waste water outlet 221 to waste water treatment tank 217.

In one embodiment, hydrocyclone 220 is connected to centrifuge 222 with centrifuge line 238. In this embodiment, centrifuge 222 is connected to waste water outlet 223 to waste water treatment tank 217 and to salt dissolving tank 224 with solids line 239.

In another embodiment without the centrifuge, hydrocyclone 220 is connected to salt dissolving tank 224.

Fifth effect evaporator 215 is further connected to salt dissolving tank 224 with solids line 240, water vapor outlet 226, and to cooled vapor line 246. Salt dissolving tank 224 is further connected to raw brine tank 225 with brine line 241. Feed line 249 is connected to raw brine tank 225. Raw brine tank 225 is connected to brine treatment 251 with brine supply line 242. Brine treatment 251 is connected to electrolytic cell 201 with brine stream 203.

In a preferred embodiment, each of first effect evaporator 210, second effect evaporator 212, third effect evaporator 213, fourth effect evaporator 214, and fifth effect evaporator 215 is a falling film effect evaporator. Other suitable evaporators known in the art may be employed.

In one embodiment, any of first effect evaporator 210, second effect evaporator 212, third effect evaporator 213, fourth effect evaporator 214, and fifth effect evaporator 215 includes a recirculation line.

In a preferred embodiment, hydrocyclone 220 is a stainless steel hydrocyclone manufactured by ChemIndustrial Systems, Inc. of Cedarburg, Wis. Other suitable hydrocyclone separators known in the art may be employed.

In a preferred embodiment, centrifuge 222 is a disc-stack centrifuge. Other suitable centrifuges known in the art may be employed.

In one embodiment, steam supply 211 is a multiple effect evaporator (MEE) steam driver. Any steam driver known in the art may be employed.

In another embodiment, steam supply 211 is a mechanical vapor recompressor (MVR) power driver. Any power driver known in the art may be employed.

In a preferred embodiment, brine treatment 251 is a clarifier to remove any sludge in the brine prior to introduction into electrolytic cell 201. Other types of solids separation known in the art may be employed.

It will be appreciated by those skilled in the art that any type of suitable piping means may be employed to connect the previously described vessels including the effect evaporators, tanks, hydrocyclone, centrifuge, and brine treatment. It will be further appreciated that any suitable directing devices including pumps, valves, sensors, controllers, supervisory control and data acquisition ("SCADA") system and software may be employed to direct steam, a liquid stream, a vapor stream and/or solids into and/or out of any of the previously described vessels.

In other embodiments, any number of holding tanks may be connected adjacent to any of effect evaporators 210, 212, 213, 214, and 215.

In other embodiments, any number of heat exchangers may be connected to any of effect evaporators 210, 212, 213, 214, and 215 to provide additional heating or cooling to the effect evaporators.

Figure 3:
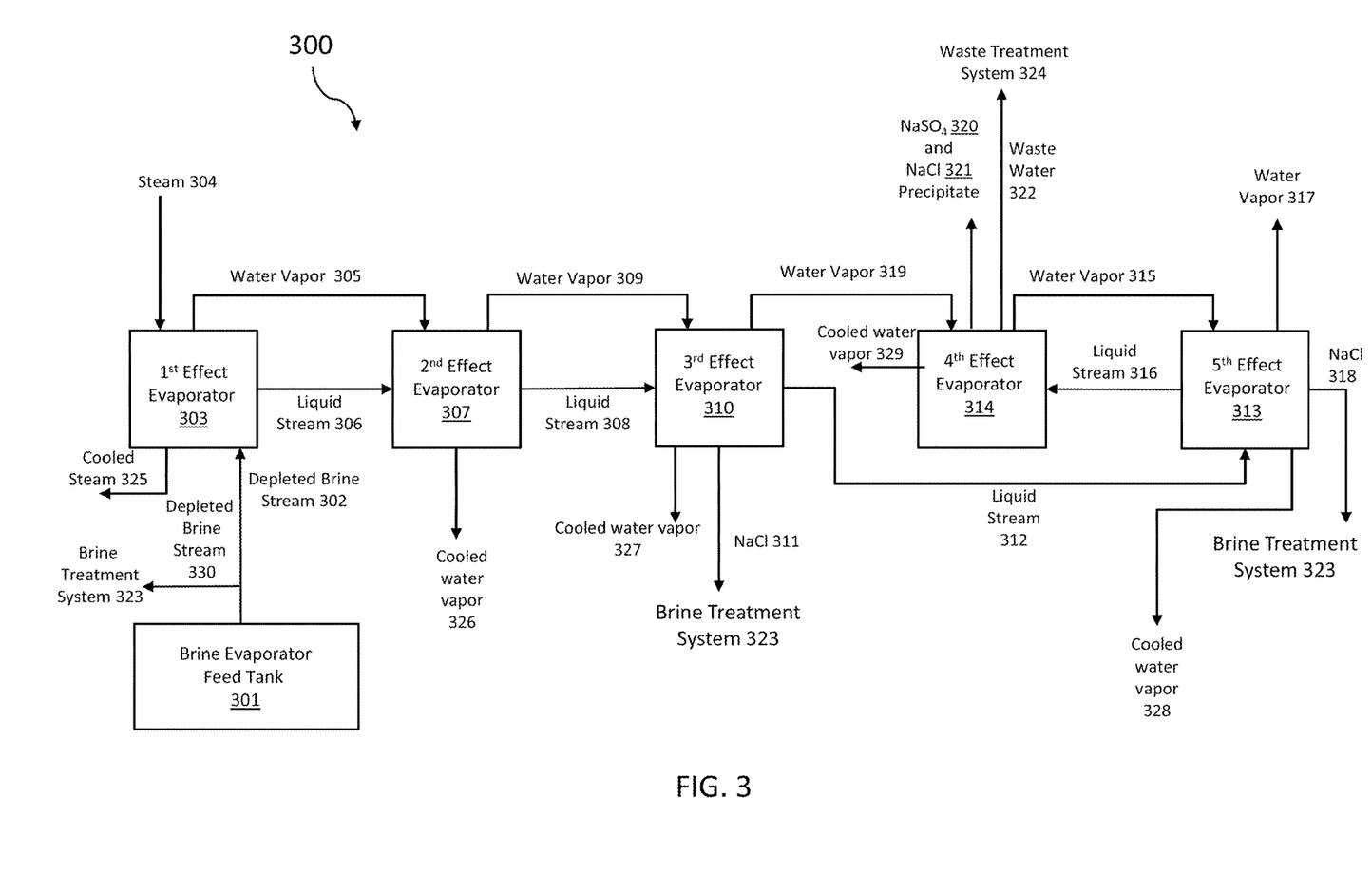
FIG. 3 is a schematic drawing of a reconstitution/evaporation system of a preferred embodiment.

Referring to FIG. 3, a preferred use of reconstitution/evaporation system 300 will now be described. In a preferred embodiment, approximately 40% to 50% of the depleted brine stored in brine evaporator feed tank 301 is sent to first effect evaporator 303 as depleted brine stream 302. Each of depleted brine streams 302 and 330 are sent at a rate of approximately 2,800 gpm to 3,200 gpm. Each of depleted brine streams 302 and 330 has a concentration level of approximately 1% to 3% NaCl and an iodine level of approximately 0.13 parts per million (ppm) to 0.17 ppm. Each of the concentration levels of the liquid streams as used in this application is defined as a percentage of the total weight. Steam 304 is introduced into first effect evaporator 303 at a rate of approximately 17,000 pounds per hour (lbm/hr) to 24,000 lbm/hr to heat depleted brine stream 302 to an operating temperature of approximately 230° F. to 244° F. for a time of approximately 12 minutes to 18 minutes. First effect evaporator 303 has an operating pressure of approximately 5 psig to 9 psig. Cooled steam 325 is produced by steam 304 heating depleted brine stream 302. Cooled steam 325 is directed out of first effect evaporator 303 at a rate of approximately 19,000 lbm/hr to 23,000 lbm/hr. Water vapor 305 is evaporated from depleted brine stream 302 in first effect evaporator 303 to create liquid stream 306. Water vapor 305 is directed from first effect evaporator 303 into second effect evaporator 307 at a rate from approximately 20,000 lbm/hr to 22,000 lbm/hr. Water vapor 305 has a temperature in a range from approximately 2400° F. to 245° F. Liquid stream 306 is directed from first effect evaporator 303 into second effect evaporator 307 at a rate from approximately 2,800 gpm to 3,200 gpm. Liquid stream 306 has a concentration level of approximately 10% to 14% NaCl and an iodine level of approximately 0.20 ppm to 0.24 ppm.

In a preferred embodiment, the levels and concentrations are measured with a spectrophotometer, such as an Agilent Cary-60 UV-Vis spectrophotometer manufactured by Agilent Technologies. The iodine levels are measured in accordance with ASTM D3869-09 (Standard Test Methods for Iodide and Bromide Ions in Brackish Water, Seawater, and Brines by the International Association for Testing and Materials (ASTM International)) wherein a 25 milliliter (ml) brine sample undergoes buffering to a slightly acidic state, along with subsequent treatment with bromine solution, sodium formate, potassium iodide, and a starch indicator. The treated sample is then read on the spectrophotometer, at a wavelength of 570 nanometers (nm), to determine concentration.

In one embodiment, cooled steam 325 is reheated and recirculated as steam 304. Any heating and recirculating means known in the art may be employed.

Water vapor 305 heats liquid stream 306 in second effect evaporator 307 to an operating temperature of approximately 210° F. to 214° F. for a time of approximately 12 minutes to 18 minutes. Cooled water vapor 326 is produced from water vapor 305 heating liquid stream 306. Cooled water vapor 326 is directed out of second effect evaporator 307 at a rate from approximately 20,000 lbm/hr to 22,000 lbm/hr. Second effect evaporator 307 has an operating pressure of approximately −2 psig to 2 psig. Water vapor 309 is evaporated from liquid stream 306 in second effect evaporator 307 to create liquid stream 308. Water vapor 309 is directed from second effect evaporator 307 into third effect evaporator 310 at a rate from approximately 20,000 lbm/hr to 22,000 lbm/hr. Water vapor 309 has a temperature in a range from approximately 2400° F. to 245° F. Liquid stream 308 is directed from second effect evaporator 307 into third effect evaporator 310 at a rate from approximately 2,800 gpm to 3,200 gpm. Liquid stream 308 has a concentration level of approximately 15% to 19% NaCl.

Water vapor 309 heats liquid stream 308 in third effect evaporator 310 to an operating temperature of approximately 210° F. to 214° F. for a time of approximately 12 minutes to 18 minutes. Cooled water vapor 327 is produced from water vapor 309 heating liquid stream 308. Cooled water vapor 327 is directed out of third effect evaporator 310 at a rate from approximately 20,000 lbm/hr to 22,000 lbm/hr. Third effect evaporator 310 has an operating pressure of approximately −2 psig and 2 psig. Water vapor 319 is evaporated from liquid stream 308 in third effect evaporator 310 to create liquid stream 312. Liquid stream 312 has a concentration level of NaCl above saturation. Sodium chloride 311 is precipitated from third effect evaporator 310 at a rate from approximately 8,000 lbm/hr to 9,000 lbm/hr into brine treatment system 323, as will be further described below. The concentration level of liquid stream 312 is reduced to approximately 19% to 23% NaCl.

Water vapor 319 is directed from third effect evaporator 310 into fourth effect evaporator 314 at a rate from approximately 20,000 lbm/hr to 22,000 lbm/hr. Water vapor 319 has a temperature in a range from approximately 2400° F. to 245° F. Liquid stream 312 is directed from third effect evaporator 310 into fifth effect evaporator 313 at a rate from approximately 2,800 gpm to 3,200 gpm.

Water vapor 315 from fourth effect evaporator 314 is directed into fifth effect evaporator 313 at a rate from approximately 20,000 lbm/hr to 22,000 lbm/hr to heat liquid stream 312 in fifth effect evaporator 313 to an operating temperature of approximately 105° F. to 115° F. for a time of approximately 12 minutes to 18 minutes. Cooled water vapor 328 is produced from water vapor 315 heating liquid stream 312. Cooled water vapor 328 is directed out of fifth effect evaporator 313 at a rate from approximately 20,000 lbm/hr to 22,000 lbm/hr. Fifth effect evaporator 313 has an operating pressure of approximately −16 psig to −12 psig. Water vapor 317 is evaporated from liquid stream 312 in fifth effect evaporator 313 to create liquid stream 316. Liquid stream 316 has a concentration level of NaCl above saturation. Sodium chloride 318 is precipitated from fifth effect evaporator 313 at a rate from approximately 8,000 lbm/hr to 9,000 lbm/hr into brine treatment system 323, as will be further described below. The concentration level of liquid stream 316 is reduced to approximately 18% to 24% NaCl.

Water vapor 317 is directed out of fifth effect evaporator 313 at a rate from approximately 20,000 lbm/hr to 22,000 lbm/hr. Liquid stream 316 is directed from fifth effect evaporator 313 into fourth effect evaporator 314 at a rate from approximately 2,800 gpm to 3,200 gpm.

Water vapor 319 from third effect evaporator 310 is directed into fourth effect evaporator 314 at a rate from approximately 20,000 lbm/hr to 22,000 lbm/hr and heats liquid stream 316 in fourth effect evaporator 314 to an operating temperature of approximately 210° F. to 214° F. for a time of approximately 12 minutes to 18 minutes. Cooled water vapor 329 is produced from water vapor 319 heating liquid stream 316. Cooled water vapor 329 is directed out of fourth effect evaporator 314 at rate from approximately 20,000 lbm/hr to 22,000 lbm/hr. Fourth effect evaporator 314 has an operating pressure of approximately −2 psig to 2 psig. Water vapor 315 is evaporated from liquid stream 316 in fourth effect evaporator 314 to form waste water 322. Waste water 322 has a concentration level of NaCl above saturation. Sodium sulfate ($NaSO_4$) 320 and sodium chloride 321 precipitate from waste water 322 in fourth effect evaporator 314 at a rate of approximately 7,000 lbm/hr to 9,000 lbm/hr. Waste water 322 then has a concentration level of approximately 17% to 21% NaCl. Waste water 322 is directed from fourth effect evaporator 314 at a rate of approximately 2,500 gpm to 3,500 pgm into waste treatment system 324, as will be further described below.

In one embodiment, cooled water vapors 326, 327, 328, and 329 are combined with water vapor 317 and condensed for use as a water supply. Any type of condensation means known in the art may be employed.

Figure 4:
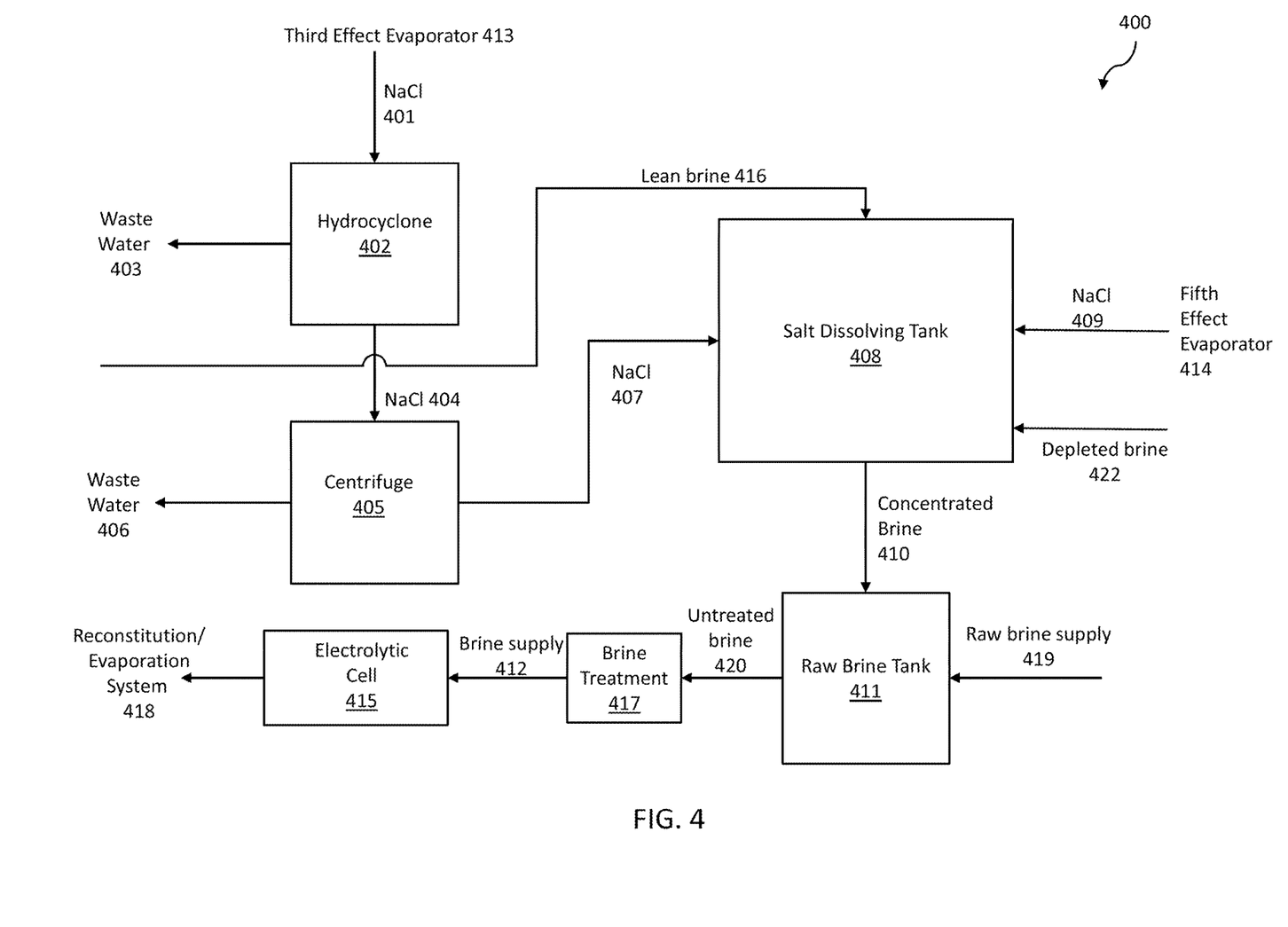
FIG. 4 is a schematic drawing of a brine treatment system of a preferred embodiment.

Referring to FIG. 4, brine treatment system 400 will now be further described. Sodium chloride 401 is directed from third effect evaporator 413 into hydrocyclone 402 at a rate from approximately 8,000 lbm/hr to 9,000 lbm/hr. Hydrocyclone 402 has a feed pressure of approximately 45 psi to 55 psi and a split ratio of approximately 82/18 to 78/22, heavies (solids) to lights (liquids). Hydrocyclone 402 spins sodium chloride 401 to separate waste water 403 from sodium chloride 404.

In one embodiment, sodium chloride 404 is directed from hydrocyclone 402 into centrifuge 405 at a rate from approximately 8,000 lbm/hr to 9,000 lbm/hr. Centrifuge 405 spins sodium chloride 404 to further separate sodium chloride 407 from waste water 406. Centrifuge 405 spins at a rate of approximately 9,000 rpm to 11,000 rpm. Sodium chloride 407 is now in a purified crystalized form.

In another embodiment, sodium chloride 404 is directed into salt dissolving tank 408 at a rate from approximately 8,000 lbm/hr to 9,000 lbm/hr.

Sodium chloride 407 is directed from centrifuge 405 into salt dissolving tank 408 at a rate from approximately 8,000 lbm/hr to 9,000 lbm/hr. Sodium chloride 409 is directed from fifth effect evaporator 414 into salt dissolving tank 408 at a rate from approximately 8,000 lbm/hr to 9,000 lbm/hr. Lean brine 416 having a concentration level of approximately 1% to 3% NaCl is directed into salt dissolving tank 408 at a rate from approximately 2,800 gpm to 3,200 gpm. Depleted brine 422 having a concentration level of approximately 1% to 3% NaCl is directed into salt dissolving tank 408 at a rate from approximately 2,800 gpm to 3,200 gpm. Sodium chloride 407 is mixed with sodium chloride 409, depleted brine 422, and lean brine 416 in salt dissolving tank 408 for a time of approximately 12 minutes to 18 minutes to form concentrated brine 410. Concentrated brine 410 has a concentration level of approximately 19% to 23% NaCl. Concentrated brine 410 is sent from salt dissolving tank 408 into raw brine tank 411 for storage. Raw brine 419 having a concentration level of approximately 19% to 23% NaCl is directed into raw brine tank 411 at a rate from approximately 2,800 gpm to 3,200 gpm. Untreated brine 420 having a concentration level of approximately 19% to 23% NaCl is directed from raw brine tank 411 to brine treatment 417 at a rate from approximately 2,800 gpm to 3,200 gpm to remove sludge. Brine supply 412 having a concentration level of approximately 19% to 23% NaCl is directed into electrolytic cell 415, which is connected to reconstitution/ evaporation system 418, at a rate from approximately 2,800 gpm to 3,200 gpm.

Figure 5:
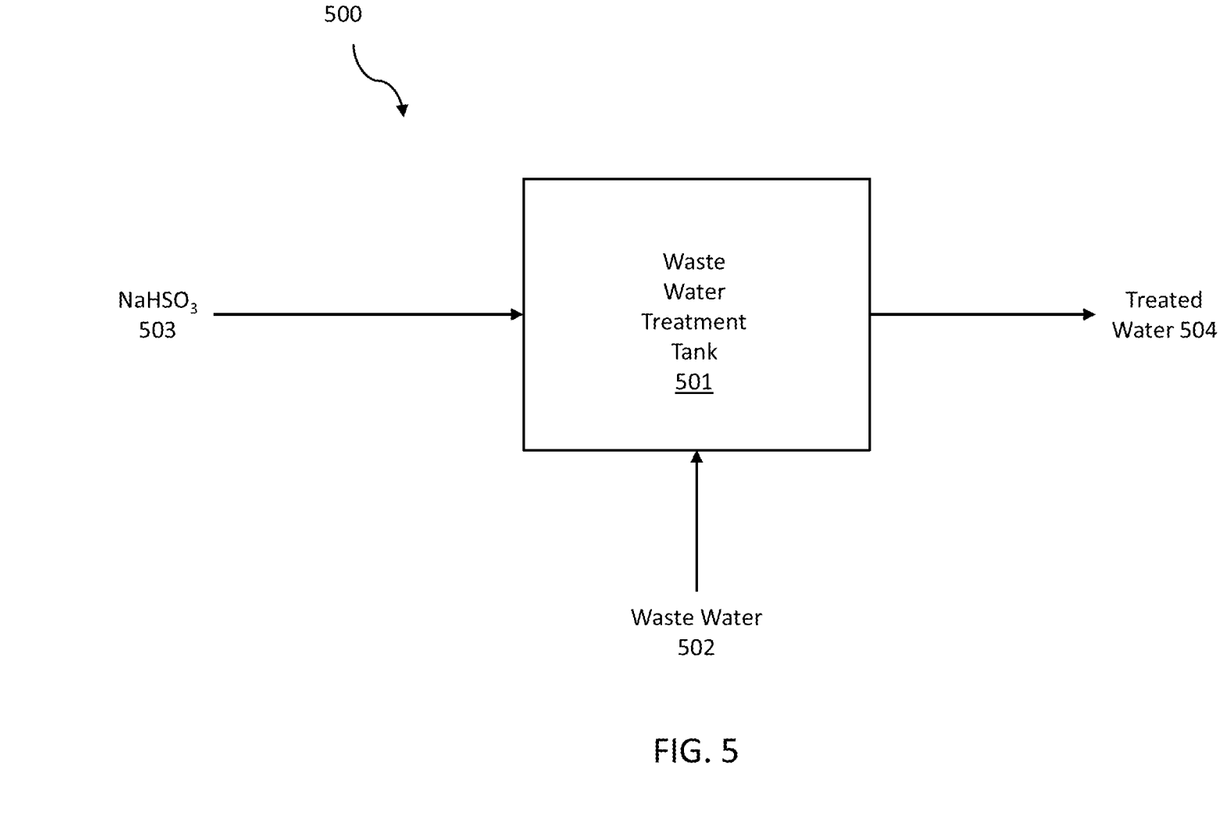
FIG. 5 is a schematic drawing of a waste water treatment system of a preferred embodiment.

Referring to FIG. 5, waste treatment system 500 will now be further described. Waste water 502 is directed from a fourth effect evaporator into waste water treatment tank 501 at a rate of approximately 2,500 gpm to 3,500 gpm. Waste water 502 includes sodium chlorate ($NaClO_3$) and sodium iodide (NaI) having concentration levels of approximately 4% to 6% and approximately 6% to 8%, respectively. In waste water treatment tank 501, the pH level of waste water 502 is adjusted to be in a pH range of approximately 6 to 7. Any suitable means for adjusting the pH level known in the art may be employed. A chlorine level of waste water 502 is measured. If the chlorine level exceeds 4 ppm, then sodium bisulfite ($NaHSO_3$) 503 is added to waste water 502 to lower the chlorine level. Waste water 502 is passed through a carbon filter to form treated water 504, which is sent to a plant outfall at a rate of approximately 2,500 gpm to 3,000 gpm.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:

1. In a system for creating a concentrated brine from a depleted brine comprising an electrolytic cell with an anode side and a cathode side separated by a membrane; a set of effect evaporators, a hydrocyclone connected to the set of effect evaporators, a salt dissolving tank connected to the set of effect evaporators and the hydrocyclone, and a waste system connected to the set of effect evaporators, a method comprising the steps of:
  removing the depleted brine from the anode side and not the cathode side;
  receiving the depleted brine into the set of effect evaporators;
  receiving steam into the set of effect evaporators;
  creating a set of liquid streams in the set of effect evaporators from the depleted brine and the steam;
  evaporating a set of water vapors from the set of liquid streams;
  removing a set of cooled water vapors from the set of effect evaporators;
  removing a precipitate from the set of liquid streams;
  separating a first solids from the precipitate;
  removing a second solids from the set of liquid streams; and,
  creating the concentrated brine from the first solids and the second solids.

2. The method of claim 1, further comprising the steps of:
  connecting a waste line to the set of liquid streams;
  removing a waste water from the waste line; and,
  creating a treated water from the waste water.

3. The method of claim 1, wherein the step of evaporating the set of water vapors from the set of liquid streams further comprises the steps of:
  heating the depleted brine with the steam to create the set of water vapors; and,
  heating the set of liquid streams with the set of water vapors.

4. The method of claim 1, further comprising the step of pressurizing the set of effect evaporators in a pressure range from about −14 psig to about 7 psig.

5. The method of claim 1, wherein the step of creating the set of liquid streams further comprises the step of concentrating the set of liquid streams from about 2% NaCl to about 21% NaCl.

6. The method of claim 1, wherein the step of creating the set of liquid streams further comprises the step of heating the set of effect evaporators in a temperature range from about 110° F. to about 237° F.

7. The method of claim 1, wherein the step of separating the first solids from the precipitate further comprises the step of concentrating the precipitate in the hydrocyclone.

8. The method of claim 7, wherein the hydrocyclone is connected to a centrifuge and wherein the step of separating the first solids from the precipitate further comprises the step of concentrating the precipitate in the centrifuge.

9. The method of claim 8, further comprising the steps of:
  removing a first water stream from the hydrocyclone; and,
  removing a second water stream from the centrifuge.

10. In a system for creating a brine feed stream for an electrolytic cell from a depleted brine comprising the electrolytic cell with an anode side and a cathode side separated by a membrane; a set of effect evaporators, a hydrocyclone connected to the set of effect evaporators, a salt dissolving tank connected to the set of effect evaporators and the hydrocyclone, a waste system connected to the set of effect evaporators, and a raw brine tank connected to the salt dissolving tank, a method comprising the steps of:
  removing the depleted brine from the anode side;
  splitting the depleted brine into a first stream and a second stream;
  receiving the first stream into the set of effect evaporators;
  receiving steam into the set of effect evaporators;

creating a set of liquid streams in the set of effect evaporators from the first stream and the steam;

evaporating a set of water vapors from the set of liquid streams;

removing a set of cooled water vapors from the set of effect evaporators;

removing a precipitate from the set of liquid streams;

separating a first solids from the precipitate;

removing a second solids from the set of liquid streams;

creating a concentrated brine from the first solids and the second solids in the salt dissolving tank; and adding the concentrated brine to the raw brine tank to create the brine feed stream.

11. The method of claim 10, further comprises the steps of:

connecting a waste line to the set of liquid streams;

removing a waste water from the waste line; and, creating a treated water from the waste water.

12. The method of claim 10, wherein the step of evaporating the set of water vapors from the set of liquid streams further comprises the steps of:

heating the first stream with the steam to create the set of water vapors; and, heating the set of liquid streams with the set of water vapors.

13. The method of claim 10, further comprising the step of pressurizing the set of effect evaporators to a pressure range of about −14 psig to about 7 psig.

14. The method of claim 10, wherein the step of creating the set of liquid streams further comprises the step of concentrating the set of liquid streams from about 2% NaCl to about 21% NaCl.

15. The method of claim 10, wherein the step of creating the set of liquid streams further comprises the step of heating the set of effect evaporators in a temperature range from about 110° F. to about 237° F.

16. The method of claim 10, wherein the step of separating the first solids from the precipitate further comprises the step of concentrating the precipitate in the hydrocyclone.

17. The method of claim 16, wherein the hydrocyclone is connected to a centrifuge and wherein the step of separating the first solids from the precipitate further comprises the step of concentrating the precipitate in the centrifuge.

18. The method of claim 10, further comprising the steps of:

adding the second stream to the salt dissolving tank; and, adding a supplemental feed to the raw brine tank.

* * * * *